(12) United States Patent
Kurtin et al.

(10) Patent No.: US 7,008,054 B1
(45) Date of Patent: Mar. 7, 2006

(54) ACTUATION MECHANISM FOR VARIABLE FOCUS SPECTACLES

(75) Inventors: Stephen Kurtin, Sherman Oaks, CA (US); Daniel E. Fedele, Simi Valley, CA (US); Saul Epstein, Sherman Oaks, CA (US)

(73) Assignee: Lane Research, LLC, Sherman Oaks, CA (US)

(*) Notice: Subject to any disclaimer, the term of this patent is extended or adjusted under 35 U.S.C. 154(b) by 0 days.

(21) Appl. No.: 10/993,804

(22) Filed: Nov. 20, 2004

(51) Int. Cl.
*G02C 1/00* (2006.01)

(52) U.S. Cl. ............... 351/41; 351/158; 359/666; 359/832

(58) Field of Classification Search ........... 351/41, 351/158; 359/665, 666, 832, 694, 703–706
See application file for complete search history.

(56) References Cited

U.S. PATENT DOCUMENTS

| 5,138,494 A | 8/1992 | Kurtin ............... 359/666 |
| 5,229,885 A * | 7/1993 | Quaglia ............. 359/665 |
| 5,371,629 A | 12/1994 | Kurtin ............... 359/666 |
| 5,668,620 A | 9/1997 | Kurtin et al. ....... 351/158 |
| 6,053,610 A | 4/2000 | Kurtin et al. ....... 351/41 |

* cited by examiner

*Primary Examiner*—Huy Mai
(74) *Attorney, Agent, or Firm*—Saul Epstein

(57) ABSTRACT

An actuating mechanism for spectacles which include two variable focus lens units. The mechanism mounts on the spectacle bridge; and includes two elongated drive levers mounted near opposite ends of the bridge, each extending toward the other end of the bridge. The free end of each driving lever is connected to its corresponding lens unit through a linkage. The driving levers are caused to rotate simultaneously, but in opposite directions, by a cam that is driven by a sliding member that slides along the bridge. By positioning the sliding member as desired, the spectacles wearer causes the cam to rotate, thereby causing the driving levers to rotate, and both lens units to change focal length.

20 Claims, 5 Drawing Sheets

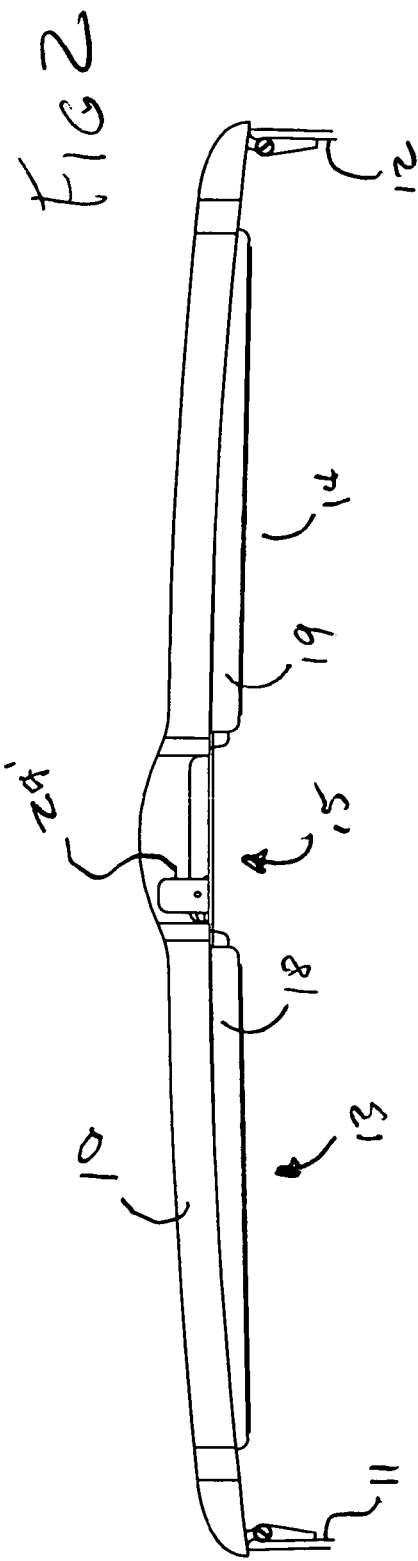
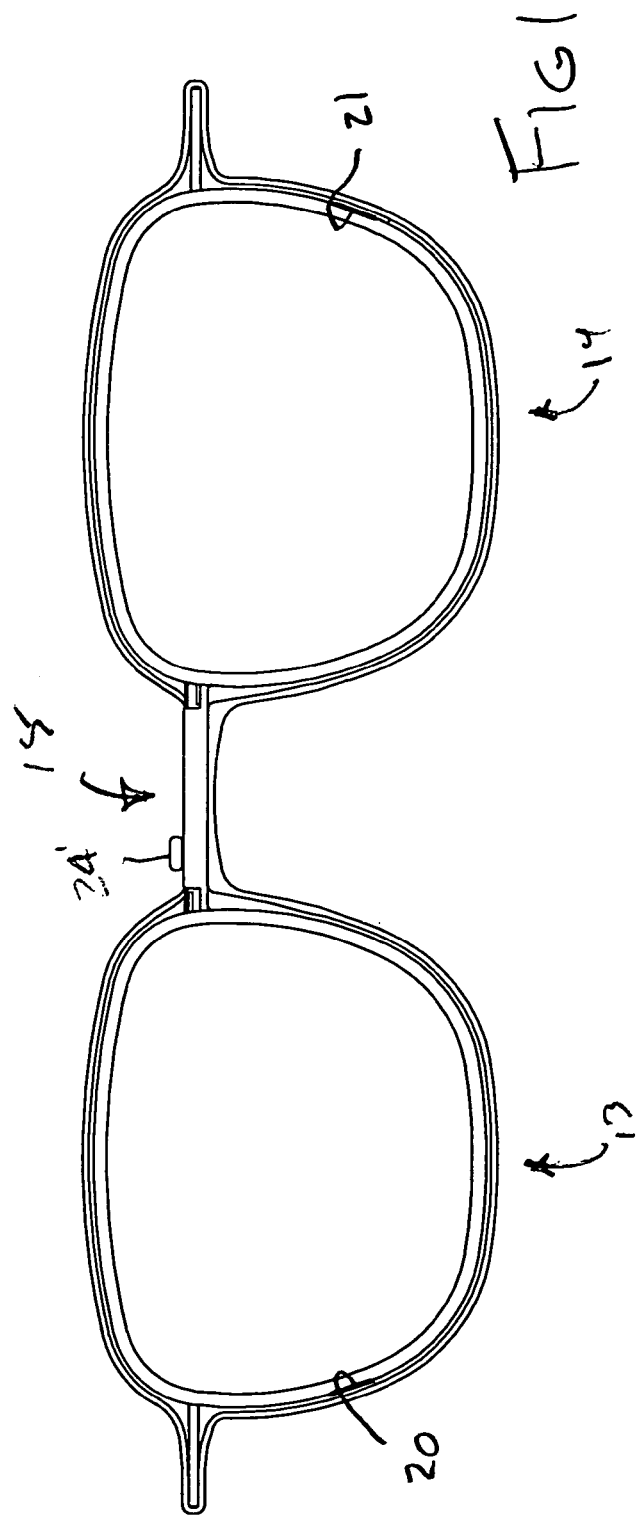

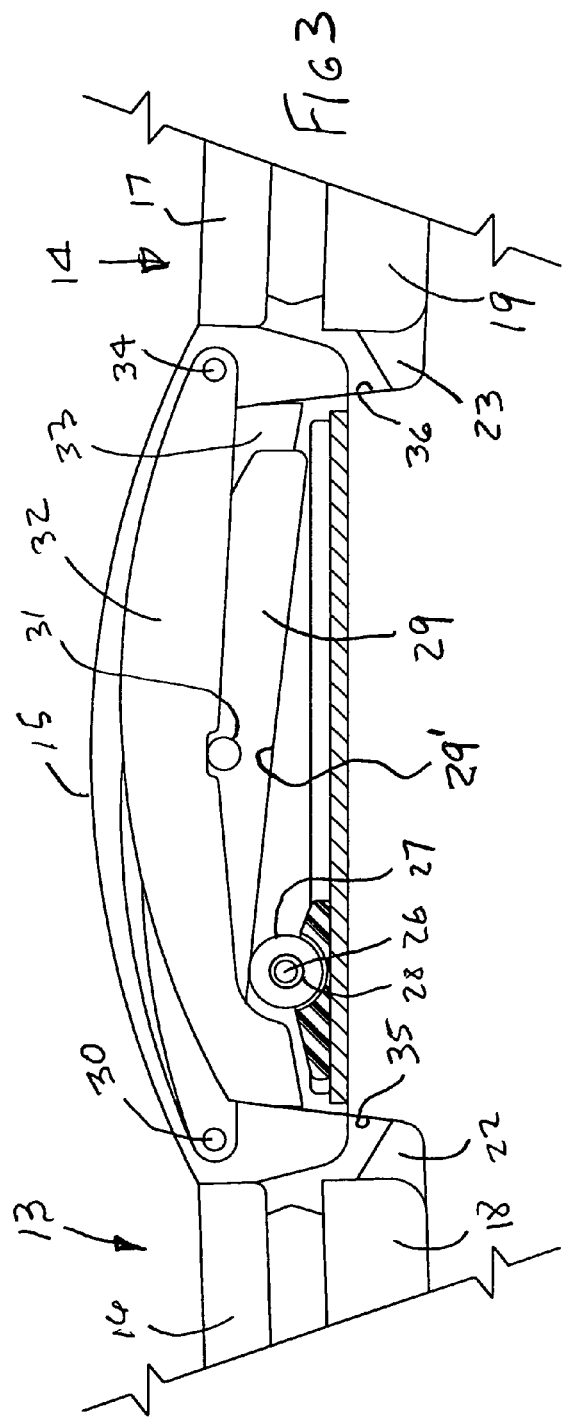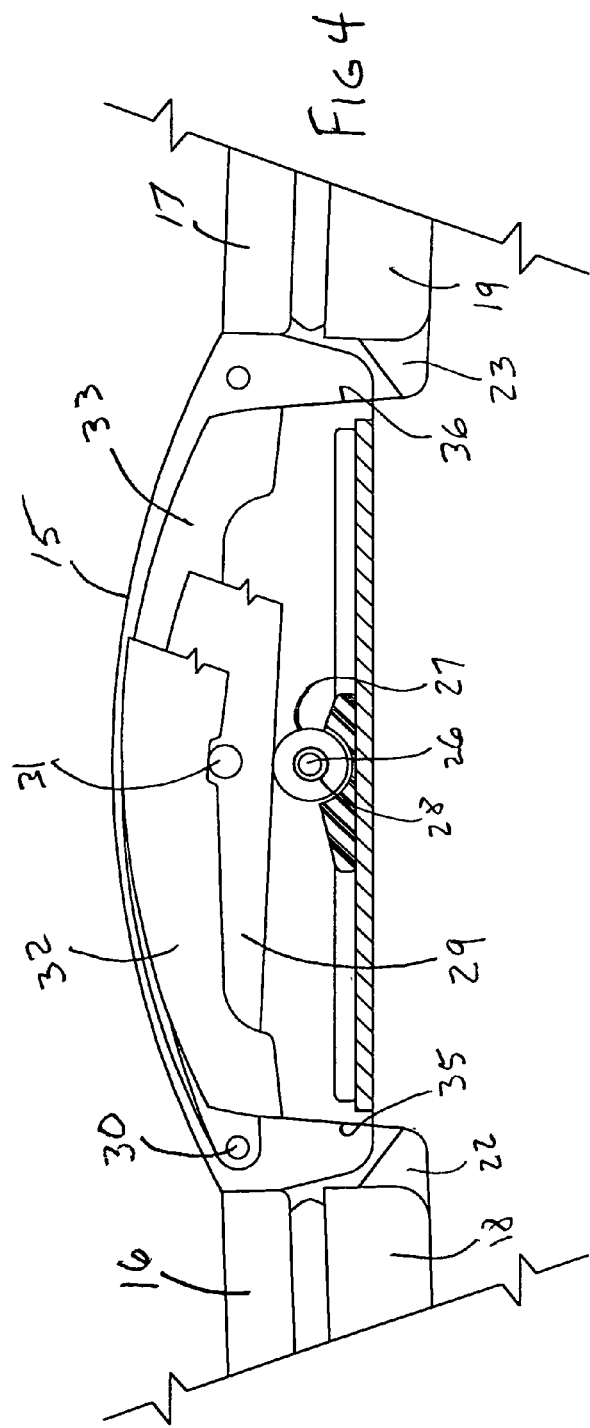

ACTUATION MECHANISM FOR VARIABLE FOCUS SPECTACLES

BACKGROUND OF THE INVENTION

This invention relates to an actuating mechanism for simultaneously adjusting the optical powers of each of the two lens units in a pair of variable focus spectacles. The invention is described in relation to lens units of the general type disclosed in U.S. Pat. No. 5,138,494 (embodiment of FIG. 9 thereof), U.S. Pat. No. 5,371,629, and U.S. Pat. No. 5,688,620. The disclosures of all of said patents are relevant hereto, and are accordingly incorporated herein by reference.

Variable focus spectacles inherently include two lens units; it is accordingly desirable that an actuation means be provided to simultaneously control the optical powers of both. The present invention is intended to provide such a means.

SUMMARY OF THE INVENTION

For convenience in explaining the present invention, a lens unit embodiment is assumed which is comprised of 1) a front ring assembly {including a front ring and a distensible membrane stretched across the field of view of the lens unit}, 2) a rear ring assembly {including a rear ring that holds a rigid lens positioned across the field of view of the lens unit}, 3) a transparent liquid filling the space between the front and rear ring assemblies, 4) a sealing bellows {which keeps the liquid from escaping, yet allows relative motion between the front and rear ring assemblies}, and 5) hinging means between the front and rear ring assemblies {that allows the rear ring assembly to rotate with respect to the front ring assembly}. To form variable focus spectacles, two such lens units are connected by a bridge. This connection may be accomplished, for example, by laser welding one end of the bridge to the front ring of one lens unit, and the other end of the bridge to the front ring of the other.

As the front and rear ring assemblies of such a lens unit are moved closer and further apart (by rotation of the rear ring assemblies about the hinging means) the focal length of the lens unit is decreased or increased (i.e., its optical power is increased or decreased). More details of the construction and operation of such lens units may be had by reference to the aforementioned patents.

The invented actuating mechanism is contained within the bridge of the spectacles, and causes the rear ring assemblies of the lens units to rotate about their respective hinges responsive to the position of a user-operated sliding member (the "slider"). The slider operates a cam, which in turn causes two elongated levers (the "driving levers") to rotate in a horizontal plane simultaneously, but in opposite directions. Each driving lever is connected, via a linkage, to a rear ring assembly. Movement of the slider causes both rear ring assemblies to rotate, thereby causing a change in optical power of each of the lens units.

BRIEF DESCRIPTION OF THE DRAWINGS

FIG. 1 is a rear view of a pair of spectacles including two variable focus lens units and an actuator according to the present invention.

FIG. 2 is a top view of the spectacles of FIG. 1.

FIG. 3 is an enlarged top sectional view of a first embodiment of the invented actuator taken at section 3—3 of FIG. 6. The slider is shown positioned for distance viewing.

FIG. 4 is an enlarged sectional view of the invented actuator as in FIG. 3, except that the slider is positioned for intermediate distance viewing, and part of the left driving lever and cam are cut away to provide a better view of the right driving lever.

DETAILED DESCRIPTION OF THE INVENTION

Figure 5:
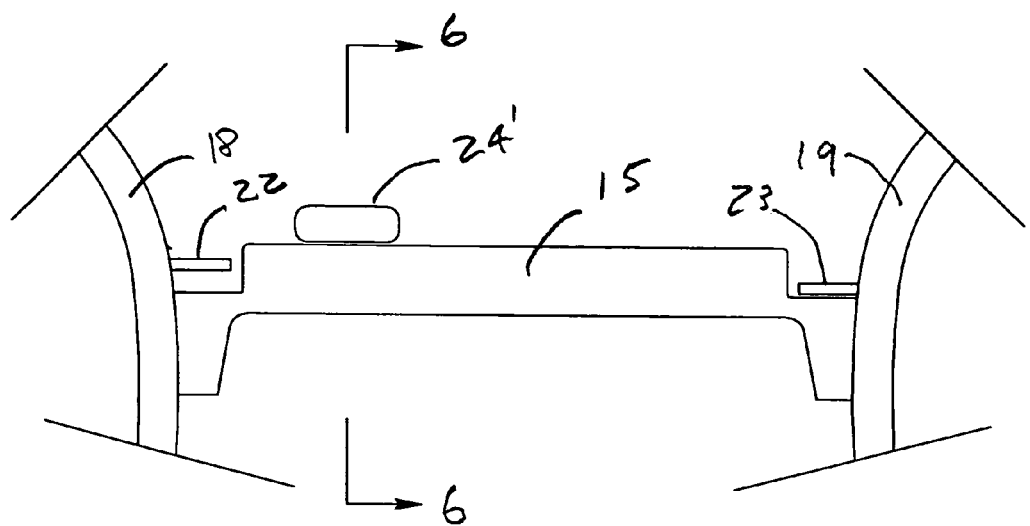
FIG. 5 is an enlarged rear view of the invented actuator as shown in FIG. 1. The ends of the driving levers and cam which otherwise would be visible from the rear are omitted in FIG. 5 for clarity.

FIGS. 1 and 2 show top and rear views of a pair of variable focus spectacles in which a first embodiment of the invented actuation mechanism is installed. Primarily for cosmetic reasons, the spectacles may include a cover 10 that effectively hides the mechanism from view. For clarity, the cover 10 is not shown other than in FIGS. 1, 2, 6, and 14. A fragment of temples 11 and 12 that are attached to the spectacles may be seen in FIG. 2.

The spectacles are comprised of two lens units 13 and 14 connected by a bridge 15. The actuator of the present invention is contained within the bridge. Only so much of the construction and operation of the lens units as is deemed necessary for an understanding of the invention is included herein, but further constructional details and an explanation of lens unit operation can be found in the referenced patents (U.S. Pat. Nos. 5,138,494, 5,371,629, and 5,688,620).

Each lens unit contains a front ring assembly (16 and 17) that is attached by laser welding, or otherwise, to the bridge 15. Rear ring assemblies 18 and 19 are hingedly attached to the respective front ring assemblies, as by leaf hinges 20 and 21. Approximately diagonally across each lens unit from the hinges, and attached to the rear ring portion of the rear ring assemblies, are linkage anchors 22 and 23. As explained in the reference patents, the focal length of a lens unit is changed by rotating the rear ring assembly with respect to the front ring assembly about the hinge. In the present invention, such rotation is accomplished by connecting the invented actuator to each rear ring assembly via the linkage anchors, and displacing the anchors in a forward or rearward direction. For purposes of this document, the direction "forward" means away from the wearer's eyes. Left and right are directions from the perspective of the spectacle wearer, as are the directions up and down.

Figure 6:
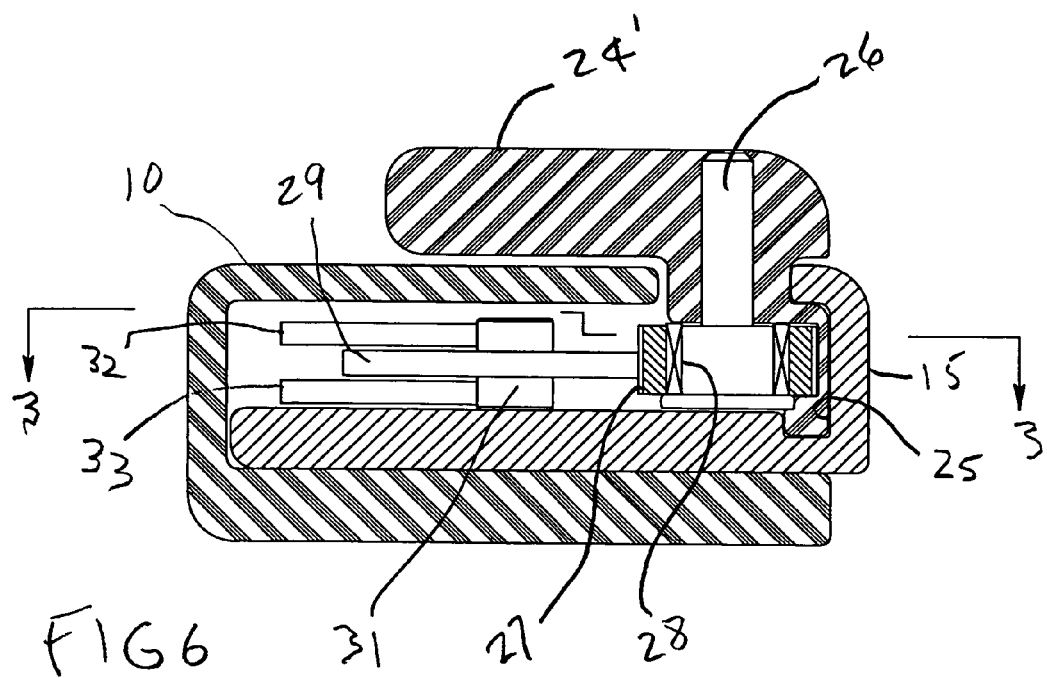
FIG. 6 is a cross sectional side view of the first embodiment of the invented actuator taken at 6—6 of FIG. 5.

FIGS. 3 and 4 are top sectional views of the invented actuator. FIG. 3 shows the slider positioned for distance viewing, while FIG. 4 shows it positioned for viewing an intermediate distance. For viewing closer distances, e.g., reading distance, slider 24 would be positioned further yet to the right. Slider 24 slides along channel 25 in bridge 15 (as best seen in FIG. 6). The wearer positions slider 24 by manipulating lip 24', which is preferably a portion of slider 24 that projects above cover 10, where it can easily be reached and positioned by the wearer. Pin 26, which may be pressed into slider 24, carries bushing 28 and (preferably toothed) roller 27. For long wear life, bushing 28 may, for example, be fabricated from Torlon 4301, and pin 26 from hardened steel. Torlon is a tradename of Solvay Advanced Polymers of Alpharetta, Ga. for a polyamide-imide plastic product. Roller 27 is preferably toothed to assure that it turns as the slider is moved, thereby minimizing frictional wear. Roller 27 is also preferably hardened.

Roller 27 runs on cam surface 29' of cam 29 and causes the cam to rotate about pivot pin 30 as slider 24 is moved. Pivot pin 30 is preferably pressed into bridge 15. As the slider 24 is moved to the right, cam 29 rotates counterclockwise. It will be appreciated that the directions of motion described herein are the directions corresponding to the particular embodiment illustrated, and that other embodiments may have some or all of the motions reversed. As cam 29 rotates, drive pin 31, which is pressed through and fixedly mounted to cam 29, bears against the rear edge of left driving lever 32 and the rear edge of right driving lever 33. The terms "left" and "right", as applied to the driving levers, are meant to indicate which lens unit is driven by the respective drive lever. As cam 29 rotates counterclockwise (about the pin 30), right driving lever 33 rotates also counterclockwise about pivot pin 30. At the same time, left driving lever 32 rotates clockwise about pivot pin 34. The right hand portions of cam 29 and left driving lever 32 are cut away in FIG. 4 so that right driving lever 33 can be clearly seen.

As seen in the figures, the cam surface 29' appears straight. However, this surface may be straight, or it may be curved gently (thereby altering the shape of the functional relationship between cam rotation and slider position). For example, it may be desired that the change in optical power with respect to change in slider position be lower near the distance viewing position of the slider than near the reading position of the slider. Changing the shape of cam surface 29' can accomplish that objective.

Figure 7:
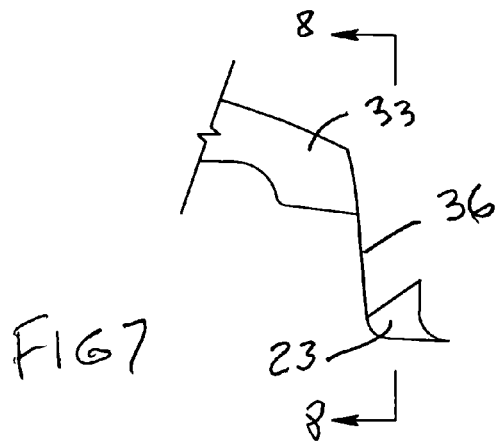
FIG. 7 is a fragmentary plan view showing one style of linkage that can be used to connect a driving lever to the rear ring of a lens unit.
Figure 8:
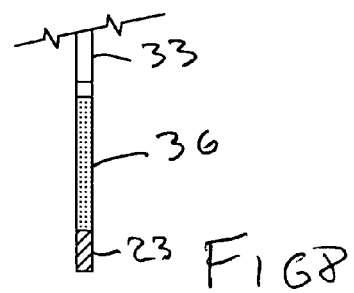
FIG. 8 is a fragmentary sectional side view of the linkage of FIG. 7 taken at 8—8 of FIG. 7.

In the embodiment of the invention shown in FIGS. 3 and 4, the free ends of driving levers 32 and 33 are coupled to the linkage anchors 22 and 23 utilizing strips of ribbon 35 and 36. The fragmentary views of the free end of driving lever 33 and linkage anchor 23 shown in FIGS. 7 and 8 illustrate the connection. The ribbon is shown stippled in FIG. 8 for clarity. It will be appreciated that each lens unit includes liquid under pressure, and therefore the lens units provide an inherent restoring force. Hence only a unidirectional actuating force (i.e., pulling) need be applied. The ribbon strips are preferably fabricated from high strength steel. The size of the ribbon section will depend on many factors in the design of the spectacles, but for illustrative purposes a section about 0.0015 thick by about 0.009 wide might be considered typical. One end of a ribbon may, for example, be laser or spot welded to the free end of a driving lever, and the other end similarly welded to the corresponding linkage anchor. As shown, each ribbon is attached to a linkage anchor (22 or 23) extending from the rear rings. The illustrated construction is a matter of convenience. Each ribbon could alternatively be attached directly to a rear ring, and in that case, linkage anchors would not used.

Figure 9:
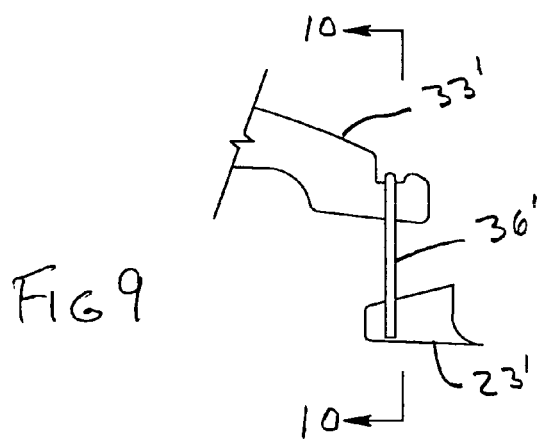
FIG. 9 is a fragmentary plan view showing a second style of linkage that can be used to connect a driving lever to a rear ring of a lens unit.
Figure 10:
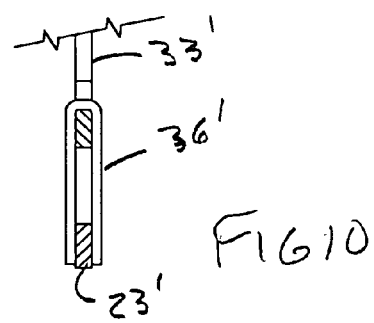
FIG. 10 is a fragmentary sectional side view of the linkage of FIG. 9 taken at 10—10 of FIG. 9.
Figure 11:
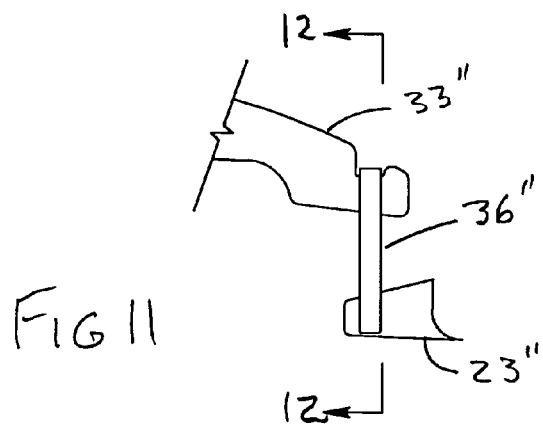
FIG. 11 is a fragmentary plan view showing a third style of linkage that can be used to connect a driving lever to the rear ring a lens unit.
Figure 12:
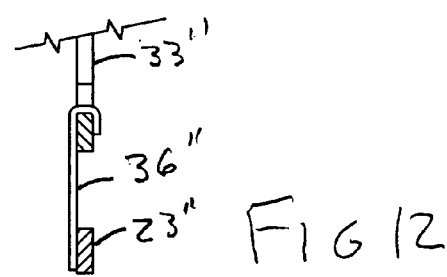
FIG. 12 is a fragmentary sectional side view of the linkage of FIG. 11 taken at 12—12 of FIG. 11.

There are many other possible configurations for the links between the driving levers and the rear rings. Two such alternate configurations are illustrated in FIGS. 9 through 12. In FIGS. 9 and 10, a wire 36', preferably having a round cross-section, is shown looped over the driving lever 33', and laser welded to linkage anchor 23'. In FIGS. 11 and 12 a hook 36", fabricated from a metal strip, is hooked over driving lever 33" and laser welded to linkage anchor 23". Other configurations are also possible, as will be appreciated by those skilled in the art.

Installing the linkages between driving levers and the lens units is preferably the last step in the production of the spectacles prior to final filling with optical fluid. Various methods of installing the links are possible; an illustration of a presently preferred method of installation is described below. For convenience of description, all reference is explicitly to ribbon links. It will be understood, however, that other types of link may be installed using similar procedures.

First, a length of ribbon longer than is ultimately required is welded to each driving lever tip. The slider 24 is positioned to its closest view position using lip 24' (all the way to the right as seen in FIGS. 1 and 2). The rear ring assembly of each lens unit is then rotated maximally forward, for example by applying a force on the rear ring near the corresponding linkage anchor. Rearward tension is applied to each ribbon, and it is welded to the appropriate linkage anchor. Excess ribbon may be cut off, and the installation is then complete.

After the linkages are installed, the lens units may be filled with liquid. For this operation, the slider is positioned for distance viewing (all the way to the left) and liquid is injected into each lens unit until the lens focal length is the desired value for distance viewing. This portion of the manufacturing process is then complete.

Figure 14:
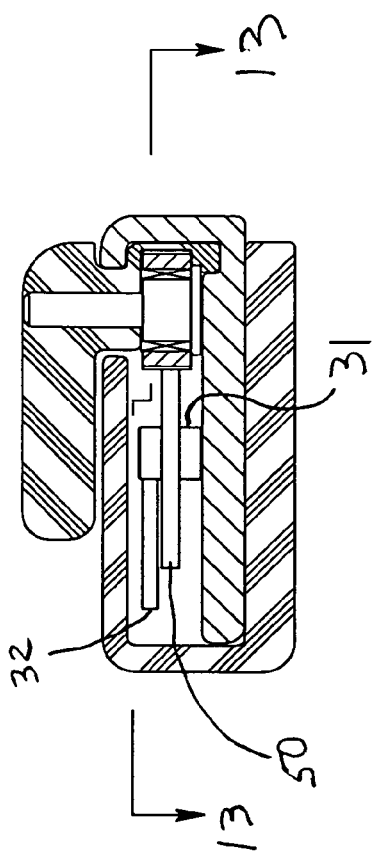
FIG. 14 is cross sectional view of the second embodiment of the invented actuator taken at the same section as was FIG. 6, namely at a position corresponding to position of 6—6 of FIG. 5.
Figure 13:
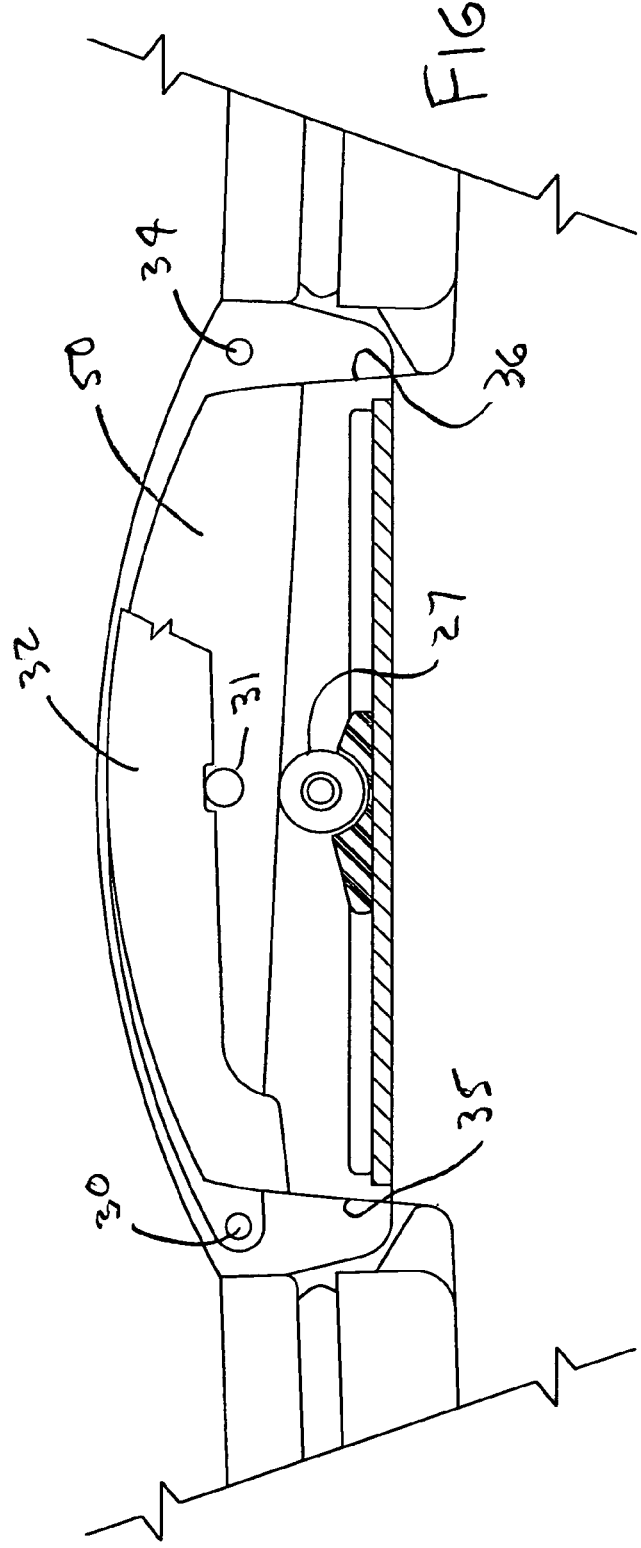
FIG. 13 is an enlarged top sectional view of a second embodiment of the invented actuator, taken at 13—13 of FIG. 14.

A second embodiment of the invention is illustrated in FIGS. 13 and 14. The second embodiment requires fewer parts than the first embodiment, however, the first embodiment has the advantage that the driving levers can be made symmetrical, and if so made, displacement errors due to bending of the driving levers tend to balance out. The parts of the second embodiment that are substantially identical to the corresponding parts of the first embodiment are given the same numeric designation as the first embodiment parts. The difference between the two embodiments resides only in that the right driving lever 33 and the cam 29 of the first embodiment are combined into one part, cam/driving lever 50. Left driving lever 32 is shown broken away in FIG. 13 so that cam/driving lever 50 may be clearly seen. Left driving lever 32 rotates about pivot pin 34 while the cam/driving lever 50 rotates about pivot pin 30. Pin 31, pressed through cam/driving lever 50 drives driving lever 32 clockwise as the cam/driving lever is rotated counterclockwise.

Two embodiments of the invented actuator have been described above but those skilled in the art will no doubt appreciate that other embodiments and variants of the above embodiments are possible within the spirit of the invention. Such other embodiments and variants are intended to be covered by the following claims.

We claim:

1. An actuation mechanism for spectacles which includes two variable focus lens units and a bridge therebetween comprising:
- a pair of rotatably mounted elongated driving levers, one mounted near each end of said bridge, each of said driving levers extending toward the end of said bridge most remote from its point of mounting;
- a pair of linkages, each coupling the free end of one of said driving levers to one of said variable focus lens units;
- a rotatable cam mounted near one end of said bridge, said cam having a cam surface;
- means for coupling said cam to said driving levers whereby rotation of said cam will cause said driving levers to rotate in opposite directions; and
- a manually operable sliding member mounted for linear motion along the length of said bridge and engaging said cam surface to cause said cam to rotate as said sliding member is moved.

2. An actuation mechanism as recited in claim 1 wherein said cam rotates about the same axis as one of said driving levers.

3. An actuation mechanism as recited in claim 2 wherein said cam is positioned between said driving levers.

4. An actuation mechanism as recited in claim 1 wherein said cam is a part of one of said driving levers, said cam surface being an edge of said driving lever.

5. An actuation mechanism as recited in claim 1 wherein said sliding member includes a user accessible lip located above said bridge.

6. An actuation mechanism as recited in claim 1 wherein said linkages are comprised of thin pieces of ribbon fastened to said driving levers and to said lens units.

7. An actuation mechanism as recited in claim 6 wherein said pieces of ribbon are fastened to said driving levers and to said lens units by welding.

8. An actuation mechanism as recited in claim 1 wherein said linkages are looped over said driving levers.

9. An actuation mechanism as recited in claim 8 wherein said linkages are comprised of wire.

10. An actuation mechanism as recited in claim 1 wherein said cam surface is straight.

11. An actuation mechanism as recited in claim 1 wherein said cam surface is curved.

12. An actuation mechanism for spectacles which include two variable focus lens units and a bridge therebetween comprising:
- first and second pins attached to said bridge near opposite ends thereof;
- first and second elongated driving levers, each mounted on one of said pins and free to rotate thereabout, each of said driving levers extending toward the end of said bridge furthest from the pin on which it is mounted;
- first and second linkages, each coupling the free end of one said driving levers to a variable focus lens unit;
- a cam disposed between said first and second elongated driving levers and rotatably mounted on said bridge, said cam having a cam surface;
- means for causing said cam to engage said driving levers for rotation in opposite directions; and
- a manually operable sliding member mounted for linear motion along the length of said bridge and engaging said cam surface to cause said cam to rotate as said sliding member is moved.

13. An actuation mechanism as recited in claim 12 wherein said cam rotates about said first pin.

14. An actuation mechanism as recited in claim 12 wherein said sliding member includes a user accessible lip located above said bridge.

15. An actuation mechanism as recited in claim 12 wherein said linkages are comprised of thin pieces of ribbon fastened to said driving levers and to said lens units.

16. An actuation mechanism as recited in claim 15 wherein said pieces of ribbon are fastened to said driving levers and to said lens units by welding.

17. An actuation mechanism as recited in claim 12 wherein said linkages are looped over said driving levers.

18. An actuation mechanism as recited in claim 17 wherein said linkages are comprised of wire.

19. An actuation mechanism as recited in claim 12 wherein said cam surface is straight.

20. An actuation mechanism as recited in claim 12 wherein said cam surface is curved.

* * * * *